(No Model.)
J. M. CREWS.
TREE PROTECTOR.
No. 503,948. Patented Aug. 29, 1893.
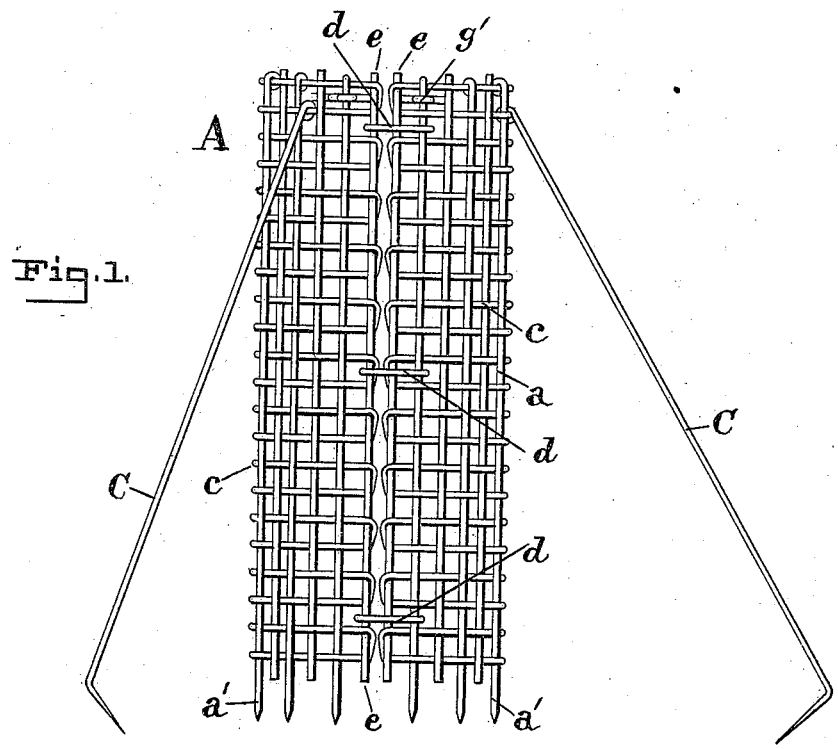
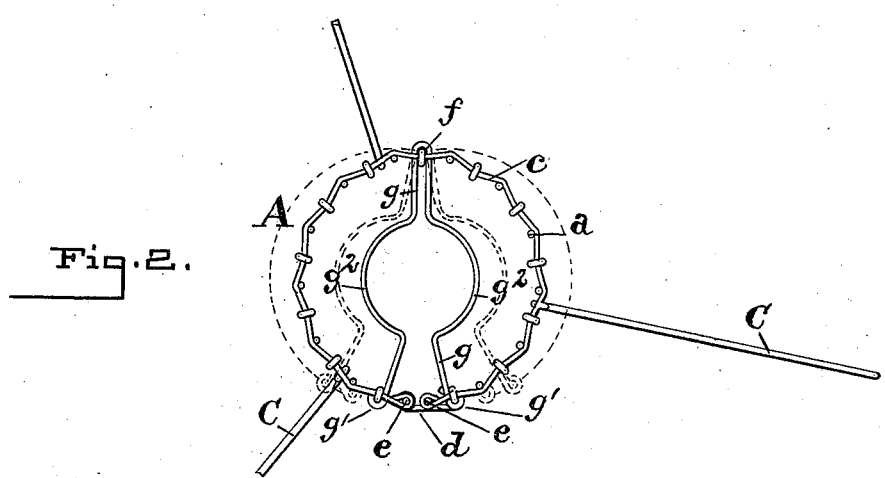
Witnesses:—
A. D. Babendrier
Alvan Macauley
Inventor:—
James M. Crews
By Chas. B. Mann
atty.

UNITED STATES PATENT OFFICE.

JAMES M. CREWS, OF ARLINGTON, TENNESSEE.

TREE-PROTECTOR.

SPECIFICATION forming part of Letters Patent No. 503,948, dated August 29, 1893.

Application filed March 6, 1893. Serial No. 464,786. (No model.)

*To all whom it may concern:*

Be it known that I, JAMES M. CREWS, a citizen of the United States, residing at Arlington, in the county of Shelby and State of Tennessee, have invented certain new and useful Improvements in Tree-Protectors, of which the following is a specification.

My invention relates to an improvement in plant and tree protectors, and has for its object to provide a convenient and easily-applied device for guarding young trees and plants.

This invention is illustrated in the accompanying drawings in which—

Figure 1. is a side-elevation showing the device and the braces for securing the same in position. Fig. 2. is a top-plan view showing the loop for securing the tree in a central position within the guard.

The letter A, indicates the guard proper, comprising a wire fabric having horizontal and vertical strands, and bent into a cylindrical form as shown. The vertical strands, $a$, extend below the horizontal strands $c$, and are designed to enter the ground and support the guard in position. The braces, C, attached to the upper edge of the guard are designed to serve as incline stays. The hooks, $d$, are designed to hold the free edges, $e$, of the guard-fabric together. It will be observed that every other one of the vertical wires, is longer than the others the lower projecting ends, $a'$, being designed to enter the ground.

Fig. 2, of the drawings shows the yoke for keeping the tree or plant in a central position with respect to the guard. It consists of a piece of stiff wire bent double at the center, as at $f$, to form two horizontal spring arms, $g$, extending diametrically across the guard and whose extremities have eyes, $g'$, which engage the vertical free edges, $e$, of the guard. The bend, $f$, of the yoke is secured to the wire of the guard midway of its two free edges; thus the free edges of the guard may be opened or spread apart, as indicated in broken lines in Fig. 2, and at the same time the two arms, $g$, of the center support are also spread apart. Each arm has a segment-shaped, or half circle bend, $g^2$, and these two bends come opposite each other. When the guard is closed about a plant or tree the bends, $g^2$, embrace the stalk of the plant in the fashion of a collar.

In devices of this kind heretofore constructed, the arms have been formed of two pieces at the upper ends of two bars or uprights which have been secured in position by bending the edges of the guard around the rods or bars. But this construction gives no spring to the arms and permits of the guard being pushed against the tree.

By making the device for keeping the tree in a central position relatively to the guard from a single piece of wire, doubled upon itself, and having its ends formed into eyes, a very effective device is secured, as when the guard is closed around the tree the curved portions $g^2$ of the arms $g$ will engage therewith and prevent the movement of the guard in any direction, and as the doubled portion will engage with the guard at one side and the eyes will engage with the edges $e$ of the guard on the opposite side, a very cheap and effective construction is secured, which are essential features in devices of this kind.

The device as thus described is complete and forms a very effective and convenient guard for trees and plants. It is readily put up and as easily to remove when desired. It may of course be made of various sizes to suit the demand, and the flexible cylindrical part may be made of any suitable material.

Having thus described my invention, I claim as new and desire to secure by Letters Patent of the United States—

A tree-protector consisting of a flexible cylindrical guard of woven wire having vertical free-edges and means for securing the same together; and a yoke for embracing the trunk of the tree to keep it centered with respect to the guard, said yoke consisting of a wire doubled upon itself at the center to form two horizontal spring-arms united by the bend, $f$, the free ends of said arms being attached respectively to the free edges of the guard, and the bend, $f$, being connected to the said guard at a point diametrically opposite said vertical free edges, said spring arms having oppositely disposed semi-circular bends, $g^2$, whereby when the guard is closed about a tree the said semi-circular bends will embrace the trunk of said tree, substantially as described.

In testimony whereof I affix my signature in the presence of two witnesses.

JAMES M. CREWS.

Witnesses:
ALVAN MACAULEY,
CHAS. B. MANN.